(12) United States Patent
Kim et al.

(10) Patent No.: US 9,803,910 B2
(45) Date of Patent: Oct. 31, 2017

(54) REFRIGERATOR AND METHOD OF MANUFACTURING METAL PHOTOCATALYST FILTER OF THE REFRIGERATOR

(71) Applicant: LG ELECTRONICS INC., Seoul (KR)

(72) Inventors: Eunjeong Kim, Changwon-si (KR); Yuri Choi, Changwon-si (KR); Myungsuk Lee, Nam-gu (KR); Jeongyon Kim, Changwon-si (KR)

(73) Assignee: LG ELECTRONICS, INC., Seoul (KR)

( * ) Notice: Subject to any disclaimer, the term of this patent is extended or adjusted under 35 U.S.C. 154(b) by 134 days.

(21) Appl. No.: 14/176,369

(22) Filed: Feb. 10, 2014

(65) Prior Publication Data

US 2014/0245771 A1    Sep. 4, 2014

(30) Foreign Application Priority Data

Feb. 12, 2013  (KR) .................. 10-2013-0015016

(51) Int. Cl.
  *F25D 17/04*   (2006.01)
  *F25D 11/00*   (2006.01)
  (Continued)

(52) U.S. Cl.
  CPC ......... *F25D 17/042* (2013.01); *B01D 53/885* (2013.01); *B01J 23/06* (2013.01);
  (Continued)

(58) Field of Classification Search
  CPC ........ F25D 17/042; F25D 27/00; F25D 11/00; F25D 2317/0417
  See application file for complete search history.

(56) References Cited

U.S. PATENT DOCUMENTS 4,954,465 A *   9/1990  Kawashima ............. A61L 9/20
                                                 502/182
6,387,844 B1 *  5/2002  Fujishima ............... A61L 9/205
                                                 427/164
(Continued)

FOREIGN PATENT DOCUMENTS

CN     1400444 A    3/2003
CN     1400445 A    3/2003
(Continued)

OTHER PUBLICATIONS

Bull. Korean Chem. Soc. 1991, vol. 20, No. 8, pp. 957-960.*
(Continued)

*Primary Examiner* — Emmanuel Duke
(74) *Attorney, Agent, or Firm* — KED & Associates, LLP

(57) ABSTRACT

A refrigerator includes a main body having a storage room formed therein, a door that opens and closes the storage room, a filter module, and a cool air circulation fan that circulates cool air through the filter module. The filter module includes a metal photocatalyst filter and a UV LED module for radiating UV rays to the metal photocatalyst filter. The metal photocatalyst filter has photocatalysts made of one of $ZnTiO_2$, $CuTiO_2$, $AgTiO_2$ or $FeTiO_2$ coated on a filter base. The filter module may allow the entire storage room to be uniformly subject to antibiosis and sterilization at a relatively low cost.

20 Claims, 5 Drawing Sheets

(51) Int. Cl.
*F25D 27/00* (2006.01)
*B01D 53/88* (2006.01)
*B01J 23/06* (2006.01)
*B01J 23/50* (2006.01)
*B01J 23/72* (2006.01)
*B01J 23/745* (2006.01)
*B01J 35/00* (2006.01)
*B01J 37/02* (2006.01)
*B01J 35/04* (2006.01)
*B01J 35/06* (2006.01)

(52) U.S. Cl.
CPC .............. *B01J 23/50* (2013.01); *B01J 23/72* (2013.01); *B01J 23/745* (2013.01); *B01J 35/004* (2013.01); *F25D 11/00* (2013.01); *F25D 27/00* (2013.01); *B01D 2255/104* (2013.01); *B01D 2255/20707* (2013.01); *B01D 2255/20738* (2013.01); *B01D 2255/20761* (2013.01); *B01D 2255/20792* (2013.01); *B01D 2255/802* (2013.01); *B01D 2257/91* (2013.01); *B01D 2258/06* (2013.01); *B01D 2259/804* (2013.01); *B01J 35/04* (2013.01); *B01J 35/06* (2013.01); *B01J 37/0225* (2013.01); *F25D 2317/0417* (2013.01)

(56) References Cited

U.S. PATENT DOCUMENTS

| | | | |
|---|---|---|---|
| 2007/0193875 A1 | 8/2007 | Ham et al. | |
| 2007/0266725 A1* | 11/2007 | Anikhindi | A61L 9/16 62/317 |
| 2008/0274018 A1* | 11/2008 | Kawai | A01M 29/12 422/122 |
| 2009/0123343 A1 | 5/2009 | Kwiatkowski | |
| 2012/0308630 A1 | 12/2012 | Averett et al. | |
| 2013/0015753 A1* | 1/2013 | Son | F25D 29/00 312/405 |
| 2013/0034470 A1* | 2/2013 | Wang | B01D 53/8668 422/121 |
| 2013/0313104 A1* | 11/2013 | Yates | B01J 12/007 204/158.2 |

FOREIGN PATENT DOCUMENTS

| | | |
|---|---|---|
| CN | 2729596 Y | 9/2005 |
| CN | 1820172 A | 8/2006 |
| CN | 102243002 A | 11/2011 |
| EP | 2 141 427 A1 | 1/2010 |
| JP | H11-309202 | 11/1999 |
| JP | 2005-214563 A | 8/2005 |
| JP | 2011-058766 | 3/2011 |
| KR | 10-2012-0075825 | 7/2012 |
| WO | WO 2007/026387 | 3/2007 |
| WO | WO 2011/162059 | 12/2011 |

OTHER PUBLICATIONS

Article: Complete photocatalllystic oxidation of 2-propanol; Topics in Catatysis, Apr. 2008, vol. 47, issue 3, pp. 166-174, Publisher: Springer.*
Bull Korean Chem. Soc., 1991, vol. 20, No. 8, pp. 957-960.*
Song et al., Bull Korean Chem. Soc., 1991, vol. 20, No. 8, pp. 957-960.*
Australian Examination Report dated Jun. 11, 2015 issued in Application No. 2014200525.
Chinese Office Action dated Nov. 2, 2015 issued in Application No. 201410048981.7.
Korean Office Action issued in Application No. 10-2013-0015016 dated Dec. 8, 2016 (full Korean text).
European Search Report dated Jan. 26, 2017 issued in Application No. 14152829.9.

* cited by examiner

REFRIGERATOR AND METHOD OF MANUFACTURING METAL PHOTOCATALYST FILTER OF THE REFRIGERATOR

CROSS-REFERENCE TO RELATED APPLICATION(S)

This application claims priority under 35 U.S.C. §119 to Korean Application No. 10-2013-0015016 filed in Korea on Feb. 12, 2013, whose entire disclosure is hereby incorporated by reference.

BACKGROUND

1. Field

This relates to a refrigerator and a method of manufacturing a metal photocatalyst filter of such a refrigerator.

2. Background

A refrigerator may maintain a freezing room and/or a cold storage room at relatively low temperature using a compressor, a condenser, an expander and an evaporator to perform a refrigerating cycle.

Bacteria may be introduced into the refrigerator in various ways. For example, bacteria may be already present in purchased food, secondary contamination may be generated due to food stored within the refrigerator for an excessive period or time, and floating bacteria may be present in air entering into the refrigerator and/or adhered to shelves, an inner casing, baskets, containers and the like within the refrigerator. Some types of bacteria that may be problematic, such as, for example, food poisoning bacilli, staphylococcus aureus, colon bacilli, listeria, campylobacteriosis, mold and other such contaminants. Nutritive substances and water through which bacteria may propagate may be supplied by the food is stored in the refrigerator, and may worsen if the refrigerator is not clean.

BRIEF DESCRIPTION OF THE DRAWINGS

The embodiments will be described in detail with reference to the following drawings in which like reference numerals refer to like elements wherein.

DETAILED DESCRIPTION

Hereinafter, a refrigerator and a method of manufacturing a metal photocatalyst filter of a refrigerator, in accordance with embodiments as broadly described herein, are described with reference to the accompanying drawings.

Figure 1:
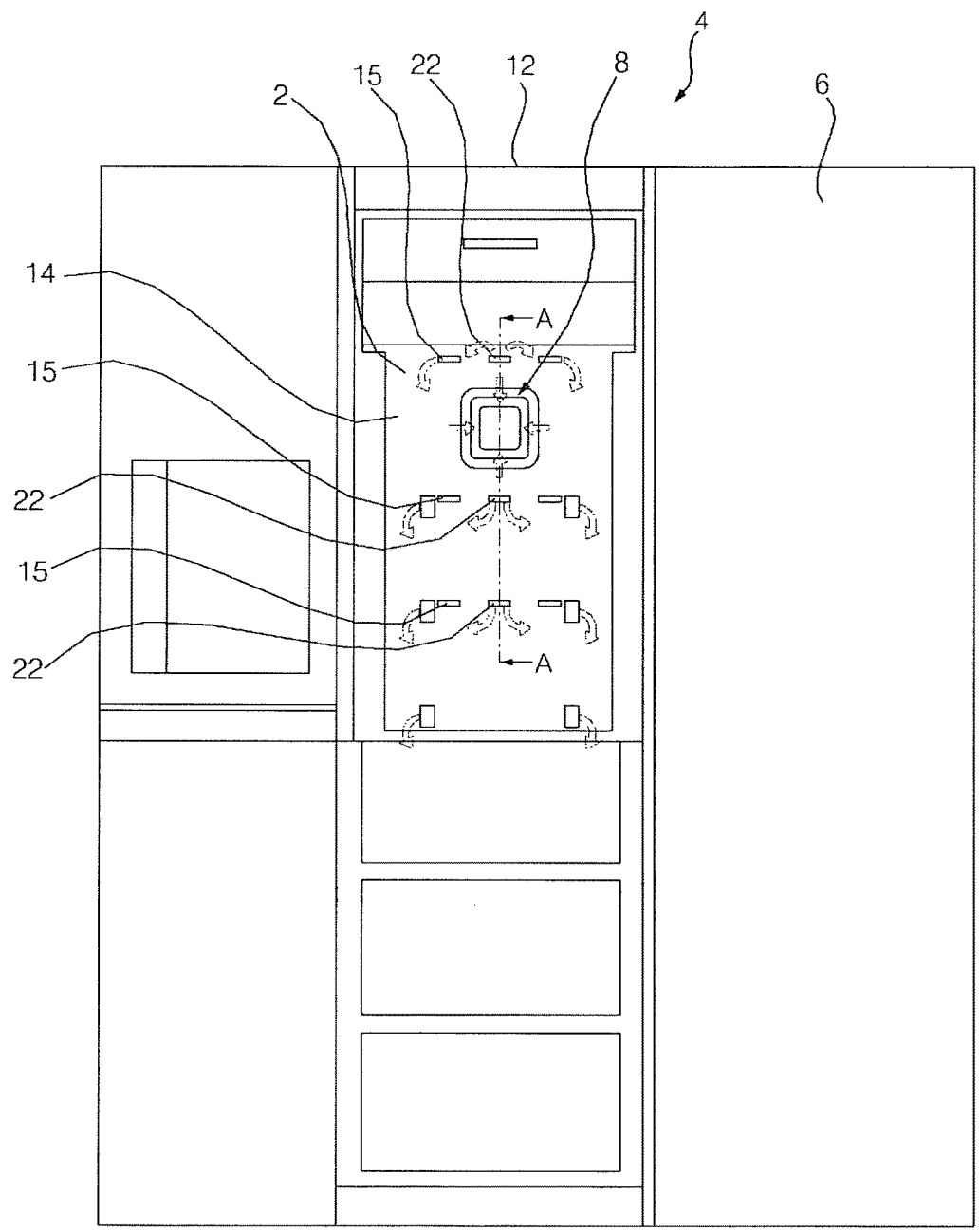
FIG. 1 is a front view of an inside of a refrigerator in accordance with an embodiment as broadly described herein.
Figure 2:
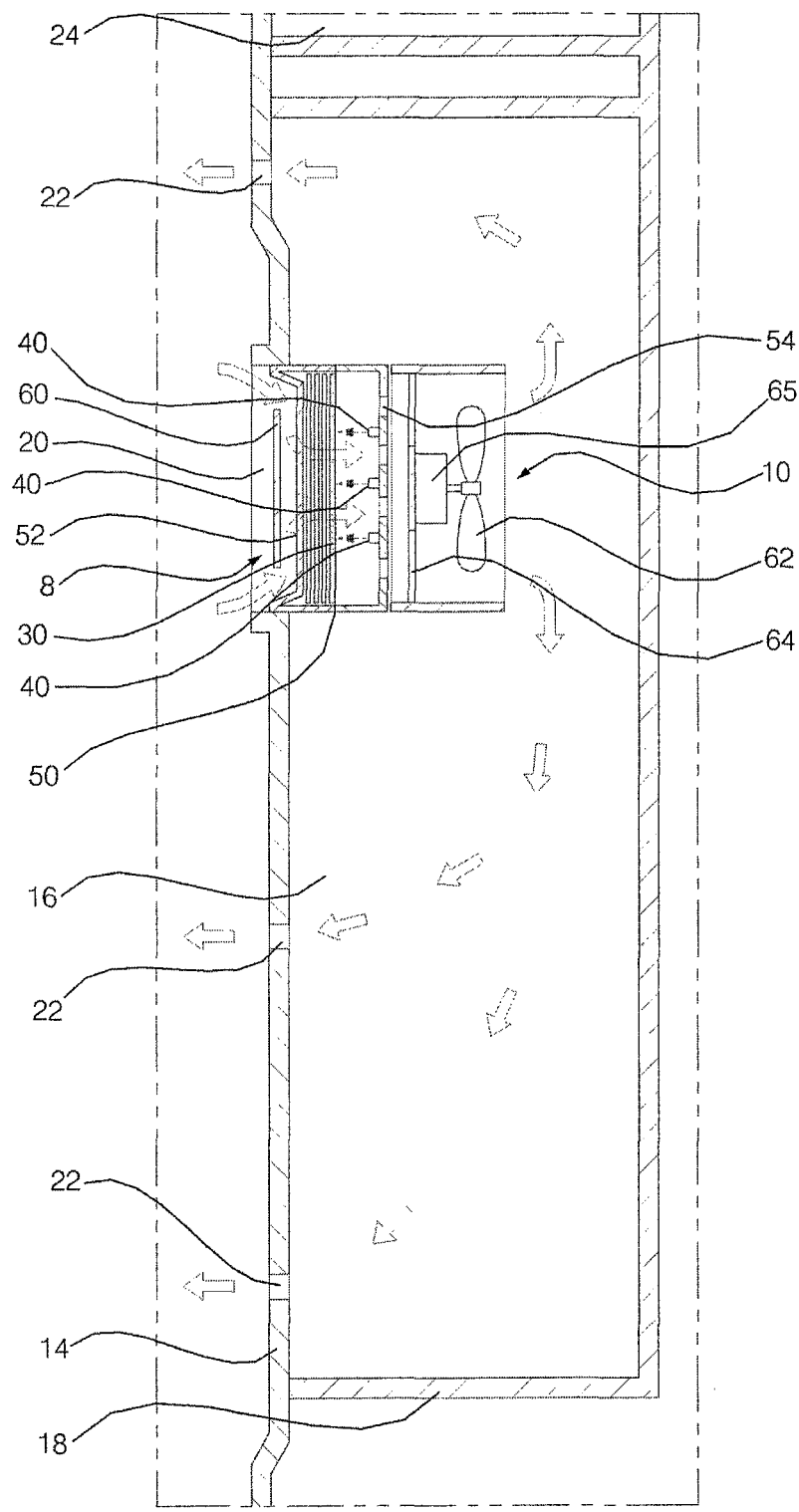
FIG. 2 is a cross-sectional view taken a long line A-A in FIG. 1.
Figure 3:
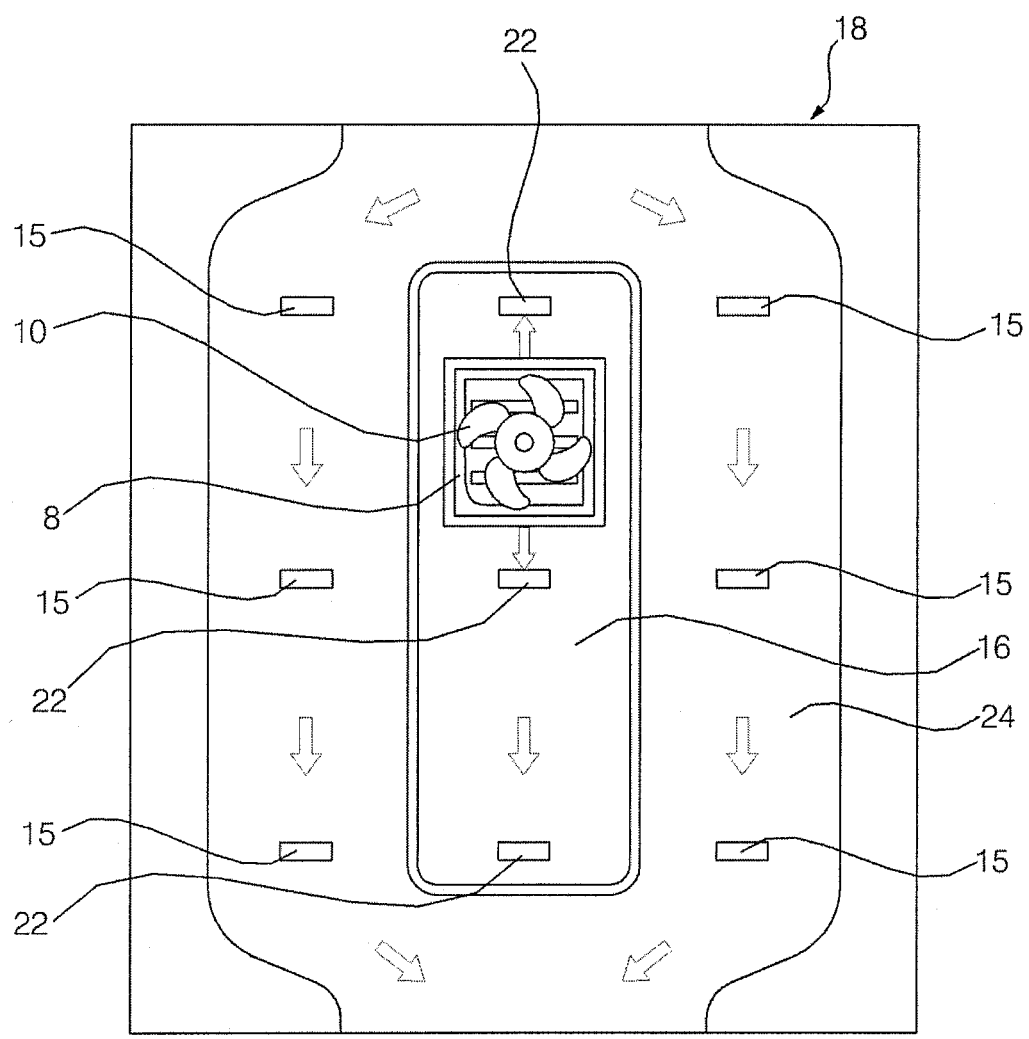
FIG. 3 is a diagram of a duct of the refrigerator shown in FIGS. 1 and 2, in accordance with an embodiment as broadly described herein.

As shown in FIGS. 1 and 2, a refrigerator as embodied and broadly described herein may include a main body 4 having a storage room 2 formed therein, a door 6 configured to open and close the storage room 2, and a filter module 8. The front of the storage room 2 may be open. The storage room 2 may define a storage space having an approximately hexahedral shape. At least one shelf on which articles, such as food items, may be placed, may be disposed in the storage room 2.

The main body 4 may include an outer casing 12 that defines an external appearance of the main body 4 and an inner casing 14 that defines the storage room 2. The inner casing 14 may be formed of one member or may be formed of a combination of a plurality of members. The main body 4 may include a single storage room 2, or a plurality of the storage rooms 2. A freezing room and a cold storage room may be partitioned within the main body 4, and the freezing room and the cold storage room may be opened and closed by respective doors 6. The main body 4 may include an insulating material disposed between the outer casing 12 and the inner casing 14. A machine room may be formed in the main body 4, and the machine room may be partitioned from the storage room 2.

A cooling device for cooling the storage room 2 may be installed in the main body 4. The cooling device may include, for example, a freezing cycle circuit or a thermo-electric module. If the cooling device includes the freezing cycle circuit, the cooling device may include a compressor for compressing a refrigerant, a condenser for condensing the refrigerant compressed by the compressor, an expansion tool for expanding the refrigerant condensed by the condenser, and an evaporator for evaporating the refrigerant expanded by the expansion tool. The compressor and the condenser may be installed in the machine room of the main body 4. A cool air supply path 24 for supplying low-temperature cool air to the storage room 2 may be formed in the main body 4. The cool air supply path 24 may include cool air supply outlets 15 for discharging cool air to the storage room 2. The cool air supply outlets 15 may be formed in the inner casing 14. The cool air supply path 24 may enable the evaporator and the storage room 2 to communicate with each other through the cool air supply outlets 15. The evaporator may be installed in a cooling room formed in the main body 2. The cooling device may include a cool air supply fan for ventilating cool air to the storage room 2 through the cool air supply path 24. The cool air supply fan may guide air, cooled by the evaporator, to the storage room 2 through the cool air supply path 24. The cooling device may include a condenser fan for guiding air outside the refrigerator to the condenser. The air ventilated from the condenser fan to the condenser may be thermally exchanged with a refrigerant and then externally exhausted.

The storage room 2 may be opened and closed by one door 6, or the storage room 2 may be opened and closed by a plurality of doors 6. The door 6 may include a freezing room door for opening and closing the freezing room and a cold storage room door for opening and closing the cold storage room. One or more of the cold storage rooms may be opened and closed by one cold storage room door. Furthermore, one or more of the cold storage rooms may be opened and closed by a plurality of cold storage room doors. Similarly, one or more freezing rooms may be opened and closed by one freezing room door, and one or more freezing rooms may be opened and closed by a plurality of freezing room doors.

The refrigerator may further include a cool air circulation fan 10 for moving cool air to the filter module 8. The cool air circulation fan 10 can circulate air within the storage room 2 into the filter module 8 and the storage room 2. One filter module 8 may be installed in the storage room 2, the cool air supply path 24, and a cool air circulation path 16.

Cool air within the storage room 2 may be circulated along the cool air circulation path 16. The cool air circulation path 16 may communicate with the storage room 2 so that cool air within the storage room 2 is circulated. In one embodiment, the filter module 8 may be installed in the cool air circulation path 16. The filter module 8, together with the cool air circulation fan 10, may be installed in the cool air circulation path 16. The cool air circulation path 16 may be formed so that air within the storage room 2 circulates through the filter module 8 and the storage room 2. The cool air circulation path 16 may form a hygiene path for maintaining the storage room 2 at an appropriate cleanliness level.

Air within the storage room 2 may flow into the cool air circulation path 16 and pass through the filter module 8. The air passing through the filter module 8 may be sterilized by the filter module 8 and then returned to the storage room 2. The cool air circulation fan 10 may move cool air within the storage room 2 to the filter module 8 with the cool air circulation fan 10 installed in the cool air circulation path 16, and may direct the air that has been sterilized by the filter module 8 back to the storage room 2. The cool air circulation fan 10 may circulate cool air within the storage room 2 through the filter module 8 and the cool air circulation path 16.

The cool air circulation path 16 may be formed in the main body 4 or in the door 6. The cool air circulation path 16 may be defined by a duct 18. The cool air circulation path 16 may be formed in the duct 18 disposed between the outer casing 12 and the inner casing 14, or, alternatively, may be formed in a duct disposed within the inner casing 14. The cool air circulation path 16 may be formed between the inner casing 14 and the duct 18.

A cool air suction hole 20 may be formed in the inner casing 14 to guide air from the storage room 2 into the circulation path 16. One or more cool air outlets 22 through which air within the cool air circulation path 16 is discharged to the storage room 2 may be formed in the inner casing 14.

The filter module 8 may be installed in a position corresponding to the cool air suction hole 20, between the cool air suction hole 20 and the cool air outlets 22 in the cool air circulation path 16. Alternatively, filter module 8 may be installed in a position corresponding to the cool air outlet 22. The refrigerator may include a plurality of cool air outlets 22, with the filter module 8 installed in the cool air suction hole 20. The filter module 8 may be detachably installed so as to pass through the cool air suction hole 20 for removal and replacement.

The filter module 8 may have a smaller size than the cool air suction hole 20 so that it may be drawn through the front of the cool air suction hole 20. That is, the filter module 8 may be removed from the storage room 2 for service. The duct 18 may form a cool air circulation path in which the cool air circulation path 16 is solely formed, or may form a multi-duct in which both the cool air circulation path 16 and the cool air supply path 24 are formed.

Air passing through the filter module 8 may be introduced into the cool air circulation path 16 of such a multi-duct and discharged to the storage room 2 through the cool air outlet(s) 22. The cool air cooled by the evaporator may be introduced into the cool air supply path 24 of such a multi-duct and discharged into the storage room 2 through the cool air supply outlets 15. If the cool air circulation path 16 is formed separately from the cool air supply path 24, when cool air circulates through the storage room 2 and the evaporator, the cool air circulation path 16 and the filter module 8 may not hinder the circulation of the cool air that circulates through the storage room 2 and the evaporator.

If cool air unnecessarily flows through the filter module 8 whenever the cool air circulates through the cool air supply path 24, the lifespan or service period of the filter module 8 may be shortened. However, if the cool air circulation path 16 is formed separately from the cool air supply path 24, the circulation resistance of the cool air that passes through the cool air supply path 24 may be minimized and the lifespan or service period of the filter module 8 may be increased.

In another exemplary embodiment, the filter module 8 may be installed in the cool air supply path 24. In such a case, the cool air circulation fan 10 may be installed in the storage room 2 or the cool air supply path 24. Air within the storage room 2 may be sterilized by the filter module 8 while passing through the cool air supply path 24 and may be discharged from the cool air supply path 24 to the storage room 2.

In yet another exemplary embodiment, the filter module 8 may be disposed within the storage room 2 or in the door 6, and the cool air circulation fan 10 may circulate air within the storage room 2 through the filter module 8. In such a case, the cool air circulation fan 10 may be installed in the storage room 2 or the door 6.

The filter module 8 may enhance the hygiene of the storage room 2. The filter module 8 may include at least one filter. The filter module 8 may include, for example, a pre-filter, or primary filter, for filtering alien substances. The filter module 8 may also include a deodorization filter for removing odors within the circulating air. The filter module 8 may also include a photocatalyst filter for antibiosis or a photocatalyst filter for sterilizing bacteria, such as viruses, using ultra-violet (UV) radiation. The sterilization ability of the photocatalyst filter may depend on the type of photocatalyst. The photocatalyst filter may be formed of a metal photocatalyst filter 30, the metal photocatalyst filter 30. The filter module 8 may include UV LEDs 40 for radiating UV to the metal photocatalyst filter 30.

The UV LED 40 may have a smaller size than a UV lamp and may be easily formed as a light source having a single wavelength band. The UV LED 40 may be a light source for radiating one of UV-A having a wavelength region of 315 to 400 nm, UV-B having a wavelength region of 280 to 315 nm, or UV-C having a wavelength region of 100 to 280 nm. In certain embodiments, the UV LED 40 may radiate UV-A to the metal photocatalyst filter 30, but embodiments are not limited thereto. For example, the UV LED 40 may radiate UV-B or UV-C to the metal photocatalyst filter 30. If the UV LED 40 radiates UV-C to the metal photocatalyst filter 30, the UV-C may directly sterilize bacteria, such as colon bacilli. If the UV LED 40 radiates UV-B to the metal photocatalyst filter 30, non-decomposable organic substances may be processed with relatively high efficiency. If the UV LED 40 radiates UV-A to the metal photocatalyst filter 30, the influence of the UV-A on the human body may be small, and production cost may be minimized compared with a case in which UV-C or UV-B is radiated. If adequate sterilization performance may be secured by radiating the UV-A to the metal photocatalyst filter 30 using the UV LED 40, the UV LED 40 may be formed of an UV-A LED for radiating the UV-A to the metal photocatalyst filter 30, stability may be increased, and the production cost may be minimized.

The filter module 8 may include a filter casing 50 for receiving the metal photocatalyst filter 30. An air suction hole 52 may be formed in the filter casing 50. Air outlets 54 through which air passing through the metal photocatalyst filter 30 is discharged may be formed in the filter casing 50. The filter casing 50 may be installed such that the air suction hole 52 is placed in front of the air outlets 56 in an air flow direction. A filter casing cover 60 may be coupled to the filter casing 50 to cover at least part of the air suction hole 52. The filter casing cover 60 may be separated from the air suction hole 52, and air within the storage room 2 may be drawn into the air suction hole 52 through a gap between the filter casing cover 60 and the filter casing 50. The filter casing 50 may have a duct shape having a certain length. The filter casing 50 may be installed along an inner wall of the storage room 2 and may extend longitudinally in the storage room 2 in the air flow direction.

Air within the storage room 2 can pass through the filter module 8 by means of the cool air circulation fan 10. The cool air circulation fan 10 may be installed adjacent to the filter module 8. The cool air circulation fan 10 may be installed in the filter module 8 or the duct 18. The cool air circulation fan 10 may include a motor 65 and a fan 62 coupled to the motor 60. The motor 60 may be installed in the filter module 8 or the duct 18 by a motor mounter 64. The cool air circulation fan 10 may have a smaller size than the cool air suction hole 20 in order to facilitate service, and the cool air circulation fan 10 may be drawn out through the front of the cool air suction hole 20 and serviced. The cool air circulation fan 10 may be installed in the cool air circulation path 16 independently from a cool air supply fan for circulating cool air within the storage room 2 through the storage room 2 and the evaporator. The cool air circulation fan 10 may be adequately controlled depending on the operating state of the refrigerator such that the filter module 8 may be efficiently used.

Figure 4:
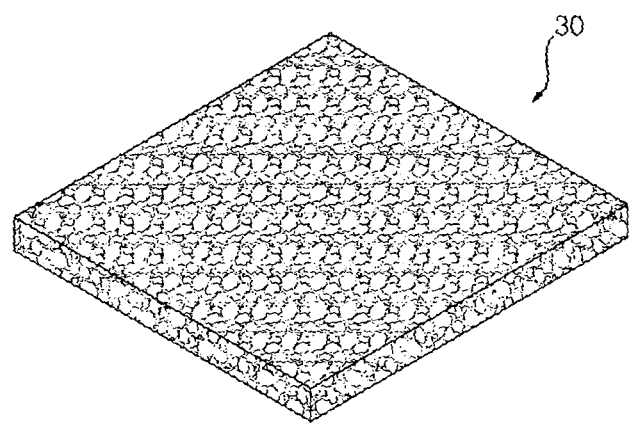
FIG. 4 is a perspective view of a metal photocatalyst filter of the refrigerator shown in FIGS. 1 and 2, in accordance with an embodiment as broadly described herein.
Figure 5:
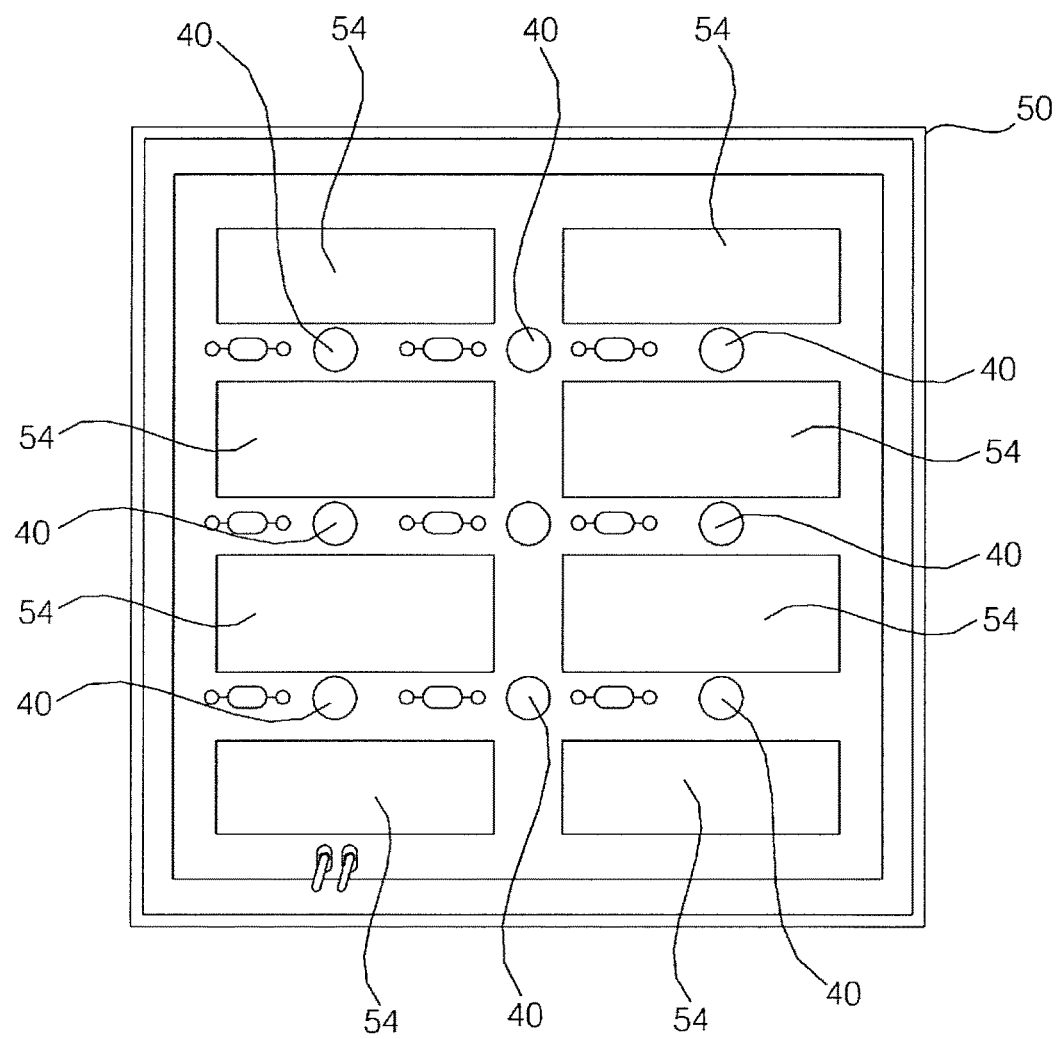
FIG. 5 is a plan view of a UV LED of the refrigerator shown in FIGS. 1 and 2, in accordance with an embodiment as broadly described herein.

FIG. 4 is a perspective view of a metal photocatalyst filter 30 of a refrigerator in accordance with an embodiment, and FIG. 5 is a diagram showing the UV LED 40 arrangement of the refrigerator in accordance with an embodiment.

The metal photocatalyst filter 30 may have photocatalysts made of one of $ZnTiO_2$, $CuTiO_2$, $AgTiO_2$ or $FeTiO_2$, and, in certain embodiments, one selected from the group consisting of $ZnTiO_2$, $CuTiO_2$, $AgTiO_2$, and $FeTiO_2$, coated on a filter base. When UV light is radiated from the UV LED 40 to the metal photocatalyst filter 30, the photocatalysts coated on the filter base are activated by the UV light, thereby sterilizing bacteria and viruses.

The filter base may be made of metal materials, such as Ni, Cu, or STS, or PP materials. The filter base may have a thickness of 1.5 mm to 4.0 mm. The filter base may have a foam or a mesh form.

The metal photocatalyst filter 30 may have photocatalysts made of one $ZnTiO_2$, $CuTiO_2$, $AgTiO_2$ or $FeTiO_2$, and, in certain embodiments, one selected from the group consisting of $ZnTiO_2$, $CuTiO_2$, $AgTiO_2$, and $FeTiO_2$, coated on a filter base formed of Ni foam. The Ni foam may have a pore size of 700 to 900 μm. The Ni foam may have a thickness of 1.5 to 4 mm.

The metal photocatalyst filter 30 may have photocatalysts made of one $ZnTiO_2$, $CuTiO_2$, $AgTiO_2$ or $FeTiO_2$, and, in certain embodiments, one selected from the group consisting of $ZnTiO_2$, $CuTiO_2$, $AgTiO_2$, and $FeTiO_2$, coated on a filter base formed of a Cu mesh.

The metal photocatalyst filter 30 may have photocatalysts made of one $ZnTiO_2$, $CuTiO_2$, $AgTiO_2$ or $FeTiO_2$, and, in certain embodiments, one selected from the group consisting of $ZnTiO_2$, $CuTiO_2$, $AgTiO_2$, and $FeTiO_2$, coated on a filter base formed of a PP mesh or PP fabrics.

The metal photocatalyst filter 30 may have photocatalysts made of one $ZnTiO_2$, $CuTiO_2$, $AgTiO_2$ or $FeTiO_2$, and, in certain embodiments, one selected from the group consisting of $ZnTiO_2$, $CuTiO_2$, $AgTiO_2$, and $FeTiO_2$, coated on filter base made of one of STS40, STS80 or STS120, and, in certain embodiments, one selected from the group consisting of STS40, STS80, and STS120.

$ZnTiO_2$, $CuTiO_2$, $AgTiO_2$, and $FeTiO_2$ may be photocatalysts having strong oxidizing power due to holes generated when electrons are excited by the radiation of external UV.

The time taken for the excited electrons to be recombined may be relatively fast. If a filter base made of metal materials, such as Ni foam or Cu mesh, is used, oxidizing power may be increased and photocatalyst efficiency, such as antibiosis and sterilization, may be increased because the recombination time of the excited electrons may be delayed.

The photocatalysts made of $ZnTiO_2$, $CuTiO_2$, $AgTiO_2$, and $FeTiO_2$ may be an inorganic solid compound having semiconductor properties. Molecular orbitals may be represented by a linear coupling of atomic orbitals, and a difference in the energy between molecular orbitals may be reduced according to an increase in the number of constituent elements. Since atoms that form a solid are numerous, a difference in the energy between molecular orbitals may become negligibly small, leading to the formation of a continuous energy band. A prohibited band gap Eg that cannot be occupied by electrons may be present between the formed bands. The highest energy band occupied by electrons so that it is fully filled with the electrons, of the energy bands of a semiconductor, is called a Valence Band (VB), and the lowest energy band not occupied by electrons is called a Conduction Band (CB). In photocatalyst reaction process, when UV energy of a wavelength having energy greater than a band gap is radiated to a semiconductor (e.g., 3.2 eV) having a great band gap, photons having energy greater than the band gap of the semiconductor (i.e., $hu \geq Eg$) are absorbed, thereby generating electron excitation from the VB to the CB. Here, electrons on a surface of the photocatalysts transit from the VB to the CB. Most of electrons and holes generated by the transition are recombined in the VB for energy stability, and some of the electrons and holes are spread and moved on a surface of the photocatalysts. OH* radicals are generated by a reaction of water or OH— adsorbed to the surface of the photocatalysts with the holes. Oxygen generates O22-radicals by a reaction with the electrons, thereby decomposing organic substances on the surface of the photocatalysts. Here, the OH* radicals and the O22-radicals are also generated by $H_2O_2$ generated as intermediate products of the reaction.

In other embodiments, plastic foam, such as urethane foam, may be used as the filter base instead of Ni foam or a Cu mesh. If photocatalysts made of one $ZnTiO_2$, $CuTiO_2$, $AgTiO_2$ or $FeTiO_2$, and, in certain embodiments, one selected from the group consisting of $ZnTiO_2$, $CuTiO_2$, $AgTiO_2$, and $FeTiO_2$, are coated on plastic foam, the coated photocatalysts may not be chemically stable because they decompose plastic. If plastic foam is sought to be used as the filter base, an additional protection coating layer using inorganic materials may be coated on the plastic foam.

If photocatalysts made of one $ZnTiO_2$, $CuTiO_2$, $AgTiO_2$ or $FeTiO_2$, and, in certain embodiments, one selected from the group consisting of $ZnTiO_2$, $CuTiO_2$, $AgTiO_2$, and $FeTiO_2$ are coated on Ni foam or a Cu mesh, the metal photocatalyst filter 30 may be chemically stabilized. The filter base on which such photocatalysts are coated may be Ni foam or a Cu mesh.

In general, plastic foam does not have a movement of electrons, but plastic foam may be decomposed or deteriorated by a chemical reaction with OH radicals having strong oxidizing power. In contrast, in the case of a filter base made of metal materials, there is a movement of electrons, but chemical oxidization/reduction decomposition does not occur in photocatalysts. Accordingly, stability is high in the deterioration of the metal materials.

A method of manufacturing the metal photocatalyst filter 30 of the refrigerator, in accordance with an embodiment, is described below.

The metal photocatalyst filter 30 may be manufactured by a pre-processing process, a coating process, and a dry process.

In the pre-processing process, the filter base formed of Ni foam or a Cu mesh, may be washed in an ultrasonic wave washer using isoprophyl alcohol through ultrasonic waves. The washing of ultrasonic waves may be performed for 1 to 5 minutes. In the pre-processing process, the filter base washed by ultrasonic waves may be washed by flowing water and may be then thermally dried at room temperature or dried in a temperature of 60 to 150 degrees for 3 to 30 minutes.

The coating process may be performed after the pre-processing process. In the coating process, the filter base formed of Ni foam or a Cu mesh in which the pre-processing process has been performed on the coating agent of the above-described photocatalysts is dipped (or digested). The time taken for the dipping (or digestion) may be, for example, 2 to 3 minutes.

The coating agent of the photocatalysts may include a mixture of the above-described photocatalysts, ethanol, water not including ions, and an SiO2 inorganic binder as in Table 1 below. Table 1 below shows the content ratio % of ethanol, water, the SiO2 inorganic binder, and the photocatalysts.

may produce uniform coating of coating materials. If a surface does not have wettability, coating may not be uniform.

For example, when a drop of water (having a surface energy of 72 dyne/cm) drops onto a leaf, there is little to no wettability, and the drop of water rolls down from the leaf because a contact angle of the drop of water likely reaches 150 degrees or more. Such a phenomenon may be referred to as an ultra water repellent phenomenon. Likewise, when a drop of water drops onto plastic materials, the drop of water appears as a bead, or shape, because there is no wettability. If ethanol drops onto plastic materials, wettability is relatively high and a contact angle of the drop of water becomes 10 degrees or less. Wettability is reduced according to an increase in the difference between the surface interface energies of materials. In order to prevent such a phenomenon, ethanol may be used to reduce a difference between the interfacial energies of the coating agent and the filter base. If ethanol content of 50% or more is included in a total content, stability of the coating agent may be achieved and the filter base may have a uniform coating property.

The dry process may be performed after the coating process. The metal photocatalyst filter 30 on which the coating process has been performed may be dried in the dry process. That is, in the dry process, the Ni foam or the Cu mesh on which the above-described photocatalysts have been coated may be dried at room temperature. The time taken for the Ni foam or the Cu mesh to be dried at room temperature may be, for example, one hour. The metal photocatalyst filter dried at room temperature may be annealed in a temperature of 60 to 150 degrees for 3 to 30 minutes, with the result that the attachment of the photocatalysts may become firm.

As described above, one $ZnTiO_2$, $CuTiO_2$, $AgTiO_2$ or $FeTiO_2$, and, in certain embodiments, one selected from the group consisting of $ZnTiO_2$, $CuTiO_2$, $AgTiO_2$, and $FeTiO_2$,

TABLE 1

| Type of Photocatalyst | $AgTiO_2$ | | | $CuTiO_2$ | | | $FeTiO_2$ | | | $ZnTiO_2$ | | |
|---|---|---|---|---|---|---|---|---|---|---|---|---|
| Ethanol | 62.5% | 55% | 55% | 62.5% | 55% | 55% | 62.5% | 55% | 55% | 62.5% | 55% | 55% |
| Water | 30% | 30% | 22% | 30% | 30% | 23% | 30% | 30% | 23% | 30% | 30% | 24% |
| $SiO_2$ inorganic | 0.5% | 1% | 1% | 0.5% | 1% | 1% | 0.5% | 1% | 1% | 0.5% | 1% | 1% |
| $AgTiO_2$ | 7% | 14% | 22% | | | | | | | | | |
| $CuTiO_2$ | | | | 7% | 14% | 21% | | | | | | |
| $FeTiO_2$ | | | | | | | 7% | 14% | 21% | | | |
| $ZnTiO_2$ | | | | | | | | | | 7% | 14% | 20% |

In Table 1, water may not include ions using ion exchange resin.

Furthermore, when ethanol content of 50% or more is included in a total content, the coating agent may be stable and coating properties may be superior. In general, all materials have their unique surface interface energies. Ni foam and a Cu Mesh, that is, metal materials, a PP mesh, and PP fabrics have different surface energies. In general, metal materials have a relatively high surface energy, and plastic has a relatively low surface energy. Furthermore, water has a relatively high surface energy of approximately 72 dyne/cm, and ethanol has a surface energy of approximately 22 dyne/cm. Materials for the coating agent of the photocatalysts reach a colloid state due to an interfacial energy and electrostatic energy with the photocatalysts and solvents (i.e., water and ethanol). Furthermore, good surface wettability and a relatively small difference in the surface interface energy between the filter base and the coating agent that is, a volatile component that has not been volatilized, and the SiO2 inorganic binder, of the metal photocatalyst filter, may remain coated on the filter base. In the metal photocatalyst filter, one $ZnTiO_2$, $CuTiO_2$, $AgTiO_2$ or $FeTiO_2$, and, in certain embodiments, one selected from the group consisting of $ZnTiO_2$, $CuTiO_2$, $AgTiO_2$, and $FeTiO_2$ and the SiO2 inorganic binder may become photocatalysts. That is, the photocatalysts may include the SiO2 inorganic binder.

In the photocatalysts of the metal photocatalyst filter, the content ratio of one selected from the group consisting of $ZnTiO_2$, $CuTiO_2$, $AgTiO_2$, and $FeTiO_2$ may be 94 to 96%, and the content ratio of the SiO2 inorganic binder may be 4 to 6%.

Hereinafter, a metal photocatalyst filter in which $ZnTiO_2$ has been coated on the filter base is called a $ZnTiO_2$ filter, a metal photocatalyst filter in which $CuTiO_2$ has been coated on the filter base is called a $CuTiO_2$ filter, a metal photocatalyst filter in which $AgTiO_2$ has been coated on the filter base is called an AgTiO2 filter, and a metal photocatalyst filter in which FeTiO2 has been coated on the filter base is called an FeTiO2 filter, simply for ease of explanation.

Table 2 shows a comparison between the sterilization ability of the metal photocatalyst filter 30 as embodied and broadly described herein and the sterilization ability of a TMIP filter.

TABLE 2

|  | ZnTiO$_2$ filter | CuTiO$_2$ filter | AgTiO$_2$ filter | FeTiO$_2$ filter | TMIP filter |
|---|---|---|---|---|---|
| 365 nm | 99.81% | 92.86% | 90.00% | 86.00% | 31.25% |
| 375 nm | 99.76% | 97.93% | 97.22% | 86.00% | 31.25% |
| 385 nm (3ø) | 99.89% | 94.93% | 98.11% | 99.20% | 37.50% |
| 385 nm (5ø) | 99.81% | 97.50% | 98.78% | 91.00% | 18.75% |
| 395 nm | 99.84% | 98.21% | 98.33% | 99.00% | 6.25% |

In Table 2, 385 nm (3ø) corresponds to a case where an UV LED having a diameter of 3ø radiates UV having a wavelength of 385 nm, and 385 nm (5ø) corresponds to a case where an UV LED having a diameter of 5ø radiates UV having a wavelength of 385 nm. In both cases, the UV LEDs have the same amount of current and voltage in the wavelengths.

Each of the samples of the metal photocatalyst filter 30 listed in Table 2 is a sample in which one of ZnTiO2, CuTiO2, AgTiO2 or FeTiO2 was coated on Ni foam. Furthermore, the TMIP filter shown in Table 2 is a filter in which TiO2 photocatalysts were coated on a surface of a titanium mesh having a corrugated or flat structure. TMIP™ series filters by U-VIX Corporation were used in experiments.

Experiments for checking the sterilization ability of the metal photocatalyst filter 30 as embodied and broadly described herein and the sterilization ability of the TMIP filter were carried out in accordance with JIS R 1702 (Fine Ceramics (advanced Ceramics, Advanced Technical Ceramics)→Test Method For Antibacterial Activity Of Photocatalytic Products And Efficacy). ZnTiO2 filter, CuTiO2 filter, AgTiO2 filter, and FeTiO2 filter samples, each having 2 cm in width×2 cm in height and a thickness of 2 mm, and a TMIP filter sample having 2 cm in width×2 cm in height were used.

In these experiments the UV LED 40 spaced apart from each of the samples by 1 cm radiated UV onto the samples for 1 hour at a low temperature of 4 degrees. The UV LED 40 can radiate UV in a wavelength region of 365 to 395 nm to the metal photocatalyst filter 30, and in certain embodiments, the UV LED 40 can radiate UV having a wavelength region of 375 to 395 nm to the metal photocatalyst filter 30, and in certain embodiments, the UV LED 40 can radiate UV having a wavelength of 385 nm to the metal photocatalyst filter 30. The UV LED 40 may have a diameter of 3 to 5ø.

As shown in Table 2, the results of the experiments reveal that the samples have different sterilization abilities according to the wavelengths radiated by the UV LED 40 and that the sterilization ability of the metal photocatalyst filter 30 is much higher than that of the TMIP filter in a range of wavelengths from 365 to 395 nm.

As can be seen from Table 2, the TMIP filter exhibits a sterilization ability having a maximum of 37.50% when the UV LED 40 has a wavelength of 365 nm to 396 nm, whereas the metal photocatalyst filter 30 in accordance with the current embodiment exhibits a sterilization ability having a minimum of 86.00% when the UV LED 40 has a wavelength of 365 nm to 395 nm. In particular, the metal photocatalyst filter 30 has a sterilization ability of 90.00% in the case of the ZnTiO2 filter, the CuTiO2 filter, and the AgTiO2 filter and has a sterilization ability that is much better than that of the TMIP filter, that is, a filter in which TiO2 photocatalysts were coated on a surface of a titanium mesh.

As can be seen from Table 2, if the UV LED 40 radiated UV having a wavelength of 385 nm to the metal photocatalyst filter 30, all of the ZnTiO2 filter, the CuTiO2 filter, the AgTiO2 filter, and the FeTiO2 filter may achieve high sterilization abilities. UV having a wavelength of 385 nm may thus be radiated to the metal photocatalyst filter 30.

In some embodiments, a plurality of the UV LEDs 40 may be installed, spaced apart from one another, for example, 2 to 20 UV LEDs 40 may be installed. The plurality of UV LEDs 40 may be disposed in a plurality of columns, and the plurality of columns may be disposed on the same plane. The plurality of columns formed by the plurality of UV LEDs 40 may be disposed in a lattice form, a cross (+) form, or an X form.

The UV LED 40 may be spaced apart from the metal photocatalyst filter 30 at an interval of 0.5 to 3 cm. The UV LED 40 may be installed in the filter casing 50 in such a way as to radiate UV to the metal photocatalyst filter 30. The UV LED 40 may be disposed to face one surface of the metal photocatalyst filter 30. The metal photocatalyst filter 30 and the UV LED 40 may be sequentially disposed in the air flow direction. The UV LED 40 may be disposed to the rear of, or downstream of, the metal photocatalyst filter 30 in the air flow direction. The UV LED 40 may be disposed in such a way as to be opposite at least part of the metal photocatalyst filter 30.

The filter base of the metal photocatalyst filter 30 as embodied and broadly described herein may be made of materials other than Ni foam.

Table 3 shows the results of experiments of sterilization abilities according to the type of filter base of the metal photocatalyst filter. Like the aforementioned experiments, the experiments were carried out in accordance with JIS R 1702.

In the experiments, a sample in which CuTiO2 was coated on Ni foam having a thickness of 2.5 mm, a sample in which CuTiO2 was coated on Ni foam having a thickness of 1.5 mm, a sample in which CuTiO2 was coated on a Cu mesh, a sample in which CuTiO2 was coated on a PP mesh, a sample in which CuTiO2 was coated on PP fabrics, a sample in which CuTiO2 was coated on STS 40, a sample in which CuTiO2 was coated on STS 80, and a sample in which CuTiO2 was coated on STS 120 were used. Each of the samples had 7 cm in width×7 cm in height, and nine UV LEDs 40 radiated UV having a wavelength of 385 nm to each of the samples. In the experiments, the UV LEDs 40 spaced apart from the samples by 1 cm radiated UV to the samples at a low temperature of 4 degrees. Table 3 shows the radiation times of the UV LEDs 40 and the results of sterilization abilities according to the type of filter base.

TABLE 3

| | Filter base | | | | | | | |
|---|---|---|---|---|---|---|---|---|
| | 2.5 T Ni foam | 1.5 T Ni foam | Cu mesh | PP mesh | PP fabrics | STS 40 | STS 80 | STS 120 |
| 1 hr | | 99.33% | 100% | 100% | 100% | 100% | 100% | 99.95% |
| 3 hr | | 99.81% | 100% | 100% | 100% | 100% | 100% | 99.95% |
| 5 hr | 95.45% | 100% | 100% | 100% | 100% | 100% | 100% | 100% |
| 8 hr | 99.93% | 100% | | | | | | |
| 10 hr | 99.93% | | | | | | | |

In Table 3, an empty space corresponds to a case where the experiments were not performed.

It can be seen that the sterilization ability of the metal photocatalyst filter 30 is regular or increased over time. In particular, it can be seen that when UV having a wavelength of 385 nm was radiated to the samples, all the samples of Table 3 have a sterilization ability of 95% or more.

Meanwhile, embodiments are not limited to the aforementioned. In other embodiments, a plurality of the metal photocatalyst filters 30 may be sequentially disposed in the filter casing 50 in the air flow direction, and a plurality of the filter bases included in the respective metal photocatalyst filters 30 that are received in one filter casing 50 may be made of different materials. Embodiments may be modified in various ways within the technical category to which the disclosure pertains.

In a system and method as embodied and broadly described herein, consumers may use refrigerators hygienically due to hygiene system capable of effectively removing odors and bacteria within a storage room at a low cost.

In a system and method as embodied and broadly described herein, cool air efficiency may be improved because the metal photocatalyst filter is disposed in an independent hygiene path separated from the cool air supply path, and thus the metal photocatalyst filter does not hinder the flow of air in the cool air path, and the metal photocatalyst filter may have a longer lifespan because it may be selectively driven.

In a system and method as embodied and broadly described herein, bacteria that may be increased within the storage room of the refrigerator may be effectively removed by radiating UV that has a specific wavelength band and may improve the sterilization ability of metal photocatalysts to the metal photocatalysts.

A refrigerator having a high sterilization ability is provided.

A method of manufacturing a metal photocatalyst filter of a refrigerator is provided, the metal photocatalyst filter having a high sterilization ability when UV is radiated.

A refrigerator as embodied and broadly described herein may include a cool air supply path configured to supply cool air to a storage room, a cool air supply fan configured to ventilate the cool air to the storage room through the cool air supply path, and a filter module configured to transmit the cool air, wherein the filter module includes a metal photocatalyst filter in which photocatalysts made of one selected from a group consisting of ZnTiO2, CuTiO2, AgTiO2, and FeTiO2 are coated on a filter base and an UV LED configured to radiate UV to the metal photocatalyst filter.

The metal photocatalyst filter and the UV LED may be sequentially disposed in an air flow direction.

The metal photocatalyst filter and the UV LED may be sequentially disposed in an air flow direction.

The UV LED may be disposed in rear of the metal photocatalyst filter in the air flow direction.

The UV LED may be spaced apart from the metal photocatalyst filter by 0.5 to 3 cm.

A plurality of columns of the UV LEDs may be disposed on the same plane.

The UV LEDs may be disposed in such a way as to be opposite at least part of the metal photocatalyst filter.

The filter module may be disposed in the cool air supply path.

The refrigerator may also include a cool air circulation path along which the air within the storage room is circulated, wherein the filter module may be disposed in the cool air circulation path.

The refrigerator may also include a cool air circulation fan installed adjacent to the filter module.

The filter module may include a filter casing in which an air suction hole and an air outlet are formed, and the metal photocatalyst filter may be disposed between the air suction hole and the air outlet.

A filter casing cover configured to cover at least part of the air suction hole and spaced apart from the air suction hole may be installed in the filter casing.

The filter casing may be configured to have a duct shape having a length and installed on an inner wall of the storage room.

The filter base may include Ni foam or a Cu mesh.

The metal photocatalyst filter may also include an SiO2 inorganic binder.

A content ratio of one selected from the group consisting of ZnTiO2, CuTiO2, AgTiO2, and FeTiO2 that belong to the photocatalysts may be 94 to 96%, and a content ratio of an SiO2 inorganic binder may be 4 to 6%.

The UV LED may radiate UV having a wavelength region of 365 to 395 nm to the metal photocatalyst filter.

The UV LED may have a diameter of 3 to 5ø.

The UV LED may radiate UV having a wavelength region of 375 to 395 nm to the metal photocatalyst filter.

The UV LED may radiate UV having a wavelength region of 380 to 390 nm to the metal photocatalyst filter.

A refrigerator in accordance with another embodiment as broadly described herein may include a cool air supply path configured to supply cool air to a storage room, a cool air supply fan configured to ventilate the cool air to the storage room through the cool air supply path, and a filter module configured to transmit the cool air, wherein the filter module includes a metal photocatalyst filter configured to have ZnTiO2 coated on a filter base and an UV LED configured to radiate UV having a wavelength region of 365 to 395 nm to the metal photocatalyst filter.

The UV LED may have a diameter of 3 to 5ø.

A refrigerator in accordance with another embodiment as broadly described herein may include a cool air supply path configured to supply cool air to a storage room, a cool air supply fan configured to ventilate the cool air to the storage room through the cool air supply path, and a filter module configured to transmit the cool air, wherein the filter module includes a metal photocatalyst filter configured to have photocatalysts made of one selected from a group consisting of AgTiO2 and CuTiO2 coated on a filter base and an UV LED configured to radiate UV having a wavelength region of 375 to 395 nm to the metal photocatalyst filter.

The UV LED may have a diameter of 3 to 5ø.

A refrigerator in accordance with another embodiment as broadly described herein may include a cool air supply path configured to supply cool air to a storage room, a cool air supply fan configured to ventilate the cool air to the storage room through the cool air supply path, and a filter module configured to transmit the cool air, wherein the filter module includes a metal photocatalyst filter configured to have FeTiO2 coated on a filter base and an UV LED configured to radiate UV having a wavelength region of 380 to 395 nm to the metal photocatalyst filter.

The UV LED may have a diameter of 3ø.

A method of manufacturing a metal photocatalyst filter of a refrigerator using metal photocatalysts, as embodied and broadly described herein, may include manufacturing a filter base, washing the filter base and pre-processing the washed filter base, digesting the filter base in a coating agent in which one selected from a group consisting of ZnTiO2, CuTiO2, AgTiO2, and FeTiO2 is mixed with ethanol, water, and an SiO2 inorganic binder are mixed, and drying the filter base on which the coating agent has been coated.

The filter base may include one of Ni foam, a Cu mesh, plastic, and STS.

A content ratio of the ethanol in the coating agent may be 50% or more.

A content ratio of the ethanol in the coating agent may be 55 to 63%.

A content ratio of the water in the coating agent may be 20 to 30%.

A content ratio of one selected from the group consisting of ZnTiO2, CuTiO2, AgTiO2, and FeTiO2 in the coating agent may be 7 to 22%.

A content ratio of the SiO2 inorganic binder in the coating agent may be 0.5 to 1%.

The time taken to digest the filter base in the coating agent may be 2 to 3 minutes.

The filter base on which the coating agent has been coated may be dried at room temperature or in a temperature of 60 to 150 degrees.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator, comprising:
a main body having a storage room formed therein;
a cool air circulation path through which air within the storage room is circulated, the cool air circulation path having a cool air suction hole and a cool air outlet;
a cool air circulation fan disposed in the cool air circulation path, and the cool air circulation fan to rotate about a rotating shaft that extends in front-rear direction and is disposed in a center of the cool air circulation path when viewed from a front side;
a metal photocatalyst filter disposed in the cool air circulation path, the metal photocatalyst filter for filtering cool air to be conveyed to the storage room; and
an ultraviolet ray (UV) LED module configured to radiate UV rays to the metal photocatalyst filter,
wherein the metal photocatalyst filter and the UV LED module are sequentially disposed in an air flow direction of the cool air, the UV LED module is disposed to a rear of the metal photocatalyst filter, and
the UV LED module includes a plurality of UV LEDs arranged across the cool air circulation path when viewed from a front side,
wherein the UV LED module includes a frame disposed across the cool air circulation path when viewed from the front side, and the plurality of UV LEDs are arranged along the frame,
wherein the plurality of UV LEDs comprising:
a first LED disposed in the center of the cool air circulation path when viewed from a front side; and
a plurality of pairs of second LEDs arranged symmetrically with respect to the first LED,
wherein the frame has at least one pair of air outlets arranged symmetrically with respect to the first LED.

2. The refrigerator of claim 1, wherein the plurality of UV LEDs are arranged in a column, and the cool air circulation path is divided by the column when viewed from the front side.

3. The refrigerator of claim 1, wherein the plurality of UV LEDs are arranged in a plurality of columns, and the cool air circulation path is divided by the plurality of columns when viewed from the front side.

4. The refrigerator of claim 1, wherein the UV LED module is spaced apart from the metal photocatalyst filter by 0.5 to 3 cm.

5. The refrigerator of claim 1, wherein the UV LED module includes the plurality of UV LEDs arranged in a direction perpendicular to the air flow direction of the cool air.

6. The refrigerator of claim 1, further comprising
a filter casing having an air suction hole and an air outlet formed therein; and
a filter casing cover covering the air suction hole, the filter casing cover spaced apart from the air suction hole, and the filter casing cover coupled to the filter casing,
wherein the metal photocatalyst filter is disposed in the filter casing, between the air suction hole and the air outlet, and
the filter casing is installed such that the air suction hole is provided in front of the air outlets in the air flow direction.

7. The refrigerator of claim 6, wherein the filter casing has a duct shape, extends longitudinally in the air flow direction, and is installed on an inner wall of the storage room.

8. The refrigerator of claim 6, wherein the filter casing is detachably installed on an inner wall of the storage room.

9. The refrigerator of claim 6, wherein the filter casing cover and the metal photocatalyst filter are detachably installed on an inner wall of the storage room.

10. The refrigerator of claim 1, wherein the photocatalysts of the metal photocatalyst filter are made of one selected from a group consisting of $ZnTiO_2$, $CuTiO_2$, $AgTiO_2$ and $FeTiO_2$.

11. The refrigerator of claim 1, wherein the UV LED module radiates, to the metal photocatalyst filter, UV rays having a wavelength of 365 nm to 395 nm to the metal photocatalyst filter.

12. The refrigerator of claim 1, further comprising a filter casing cover covering the cool air suction hole, the filter casing cover spaced apart from the cool air suction hole,
wherein the filter casing cover, the metal photocatalyst filter and the UV LED module are disposed in a row.

13. The refrigerator of claim 1, wherein the cool air circulation fan is disposed to a rear of the UV LED module.

14. The refrigerator of claim 13, further comprising a filter casing cover covering the cool air suction hole, the filter casing cover spaced apart from the cool air suction hole,
wherein the filter casing cover, the metal photocatalyst filter, the UV LED module and the cool air circulation fan are disposed in a row.

15. The refrigerator of claim 13, wherein the cool air outlet includes a plurality of cool air outlets disposed in an upper and lower part of an inner wall of the storage room.

16. The refrigerator of claim 1, wherein the air flow direction penetrates the UV LED module.

17. The refrigerator of claim 1, further comprising:
a cool air supply path provided in the main body and configured to supply cool air to the storage room; and
a cool air supply fan configured to supply the cool air to the storage room through the cool air supply path,
wherein both the cool air circulation path and the cool air supply path are formed in a multi-duct.

18. The refrigerator of claim 1, wherein the metal photocatalyst filter includes photocatalysts coated on a filter base, and the filter base that includes foam or mesh made by metal material.

19. The refrigerator of claim 1, wherein the plurality of UV LEDs arranged in a plurality of columns are disposed on a single plane perpendicular to the air flow direction of the cool air.

20. The refrigerator of claim 1, wherein the frame having a plurality of pairs of air outlets arranged symmetrically with respect to the first LED.

* * * * *